(12) United States Patent
Matsunaga

(10) Patent No.: US 12,140,190 B2
(45) Date of Patent: Nov. 12, 2024

(54) MULTIPLE-DISC FRICTION CLUTCH

(71) Applicant: HONDA MOTOR CO., LTD., Tokyo (JP)

(72) Inventor: Naoya Matsunaga, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/524,052

(22) Filed: Nov. 30, 2023

(65) Prior Publication Data
US 2024/0247689 A1 Jul. 25, 2024

(30) Foreign Application Priority Data

Jan. 19, 2023 (JP) ................................. 2023-006336

(51) Int. Cl.
*F16D 23/12* (2006.01)
*F16D 13/52* (2006.01)
*F16D 13/70* (2006.01)

(52) U.S. Cl.
CPC ............. *F16D 13/52* (2013.01); *F16D 13/70* (2013.01); *F16D 23/12* (2013.01)

(58) Field of Classification Search
CPC .......................... F16D 13/52–2013/565; F16D 23/12–2023/123
See application file for complete search history.

(56) References Cited

U.S. PATENT DOCUMENTS

| 2,415,393 | A | * | 2/1947 | Deimel | F16D 23/06 192/53.34 |
| 6,666,283 | B2 | * | 12/2003 | Frauhammer | B25F 5/00 464/37 |
| 2015/0001028 | A1 | * | 1/2015 | Yoshimoto | F16D 13/56 192/70.23 |
| 2016/0230815 | A1 | * | 8/2016 | Miyazaki | F16D 13/56 |
| 2023/0313844 | A1 | * | 10/2023 | Matsunaga | F16D 13/583 192/66.31 |

FOREIGN PATENT DOCUMENTS

| CN | 104169601 A | * | 11/2014 | ............ F16D 13/52 |
| JP | 3699303 B2 | | 9/2005 | |

* cited by examiner

*Primary Examiner* — Ernesto A Suarez
*Assistant Examiner* — Lillian T Nguyen
(74) *Attorney, Agent, or Firm* — Carrier, Shende & Associates P.C.; Joseph P. Carrier; Fulchand P. Shende

(57) ABSTRACT

A multiple-disc friction clutch has a clutch center including a first and second clutch centers. The first clutch center is axially supported by a main shaft in a relatively non-rotatable manner. The second clutch center is supported by the first clutch center in a relatively rotatable manner and holds a clutching part between a pressure plate and the second clutch center. The first and second clutch centers have a torque limiter mechanism and a torque limiter-disabling mechanism therebetween. The torque limiter mechanism transmits power between the first and second clutch centers and reduces clutch torque by acting on the pressure plate due to relative rotation between the first and second clutch centers. The torque limiter-disabling mechanism inhibits operation of a torque limiter of the torque limiter mechanism by preventing the relative rotation when power is transmitted from the first clutch center to the second clutch center in an acceleration direction.

5 Claims, 7 Drawing Sheets

MULTIPLE-DISC FRICTION CLUTCH

BACKGROUND

1. Technical Field

The present invention relates to a multiple-disc friction clutch.

2. Description of the Background

Motorcycles receive an increased load at the rear wheel when the engine brake is activated by shifting down.

Particularly in driving in a race or the like, strong engine brake tends to be actuated when rapid deceleration is performed by shifting down quickly. In view of this, in order to reduce a load applied to a rear wheel due to engine braking, a multiple-disc friction clutch is provided with a back torque limiter mechanism for reducing clutch torque that is transmitted from the rear wheel.

An internal combustion engine may be started by a kick-start or a push-start in which a clutch is engaged after a vehicle body is pushed forward. In such a situation, the back torque limiter mechanism undesirably operates to reduce torque that is transmitted to the internal combustion engine, whereby the internal combustion engine is not smoothly started.

There is an example of a multiple-disc friction clutch that copes with this phenomenon (e.g., Patent literature 1). This multiple-disc friction clutch has a torque limiter-releasing mechanism that releases a torque limiter of a back torque limiter mechanism when a clutch output shaft is stopped or is operated in a low-rotation range of not greater than an idling speed.

CITATION LIST

Patent Literature

Patent literature 1: Japanese Patent No. 3699303

BRIEF SUMMARY

The friction clutch that is disclosed in Patent literature 1 is a multiple-disc friction clutch having a clutching part that includes a plurality of plates for transmitting and shutting off torque. The clutching part is interposed between a clutch drum (clutch housing), which is coupled to a clutch input side, and a clutch hub (clutch center), which is coupled to a clutch output side. The clutch hub is composed of a first hub body, which is directly coupled to a clutch output shaft, and a second hub body, which is supported by the first hub body in a relatively rotatable manner. A cam mechanism is structured between the first hub body and the second hub body. The friction clutch is provided with a back torque limiter mechanism that reduces clutch capacity of the clutching part (degree of torque to be transmitted) by the action of the cam mechanism. When a rotation speed of the first hub body exceeds that of the second hub body, the cam mechanism operates by relative rotation between the first hub body and the second hub body, and it axially moves the second hub body to push a pressure plate.

The friction clutch is also provided with a torque limiter-releasing mechanism that releases a torque limiter of the back torque limiter mechanism by disabling relative rotation between the first hub body and the second hub body when the clutch output shaft is stopped or is operated in a low-rotation range.

The disclosed torque limiter-releasing mechanism has a steel ball that is contained in a guide groove formed over between the first hub body and the second hub body. The steel ball can be moved against an elastic force of a coil spring by a centrifugal force. When the clutch output shaft is stopped or is operated in a low-rotation range, the steel ball is moved by the elastic force of the coil spring and locks to both of the first hub body and the second hub body to disable relative rotation therebetween.

This torque limiter-releasing mechanism releases the torque limiter of the back torque limiter mechanism to disable relative rotation between the first hub body and the second hub body when the clutch output shaft is stopped or is operated in a low-rotation range during stop or low-speed driving of a motorcycle. Thus, a push-start and a kick-start can be smoothly performed.

In the torque limiter-releasing mechanism disclosed in Patent literature 1, when the clutch output shaft is stopped or is operated in a low-rotation range, the steel ball locks to both of the first hub body and the second hub body to disable relative rotation therebetween. In more detail, the steel ball inhibits the first hub body and the second hub body from rotating relatively when back torque is transmitted from the first hub body on the clutch output shaft side to the second hub body and also when power is transmitted from the second hub body to the first hub body in a reverse manner.

When the clutch output shaft is stopped or is operated in a low-rotation range, a great acceleration may be applied in the state in which the torque limiter-releasing mechanism releases the torque limiter of the back torque limiter mechanism, that is, in the state in which the steel ball locks to both of the first hub body and the second hub body to disable relative rotation therebetween. In this case, stress concentrates on parts at which the steel ball of the torque limiter-releasing mechanism locks to the first hub body and the second hub body, and therefore, the parts are required to have high strength.

For example, in a race such as a motocross race, an accelerator or a rear brake may be operated to control the attitude by a gyro effect of a vehicle during jumping.

Specifically, at the start of jumping, since the vehicle speed is still high, the steel ball is moved in a centrifugal direction against the biasing force by a centrifugal force, and it releases locking of the first hub body and the second hub body. Then, when a rear brake is used by gripping a clutch during jumping, the clutch output shaft is stopped, and the steel ball is moved toward a rotation axis center by the biasing force. Thus, the steel ball locks to both of the first hub body and the second hub body to disable relative rotation therebetween.

Under these conditions, the clutch may be engaged, and the vehicle body may land on the ground. In this case, a very high acceleration is applied to the second hub body due to a high number of revolutions at the time of engaging the clutch, whereby stress concentrates on the parts at which the steel ball locks to the first hub body and the second hub body.

The present invention has been achieved in view of these circumstances, and an object of the present invention is to provide a multiple-disc friction clutch having a torque limiter mechanism that includes a torque limiter configured to not operate so as to prevent stress from concentrating on a part of the torque limiter mechanism, when back torque or acceleration is applied in a state in which a clutch output shaft is stopped or is operated in a low-rotation range.

In order to achieve the above object, the present invention provides a multiple-disc friction clutch including a clutch housing, clutch centers, a clutching part, a pressure plate, and a biasing member. The clutch housing is axially supported by a clutch output shaft in a rotatable manner and is configured to receive drive torque from an internal combustion engine. The clutch centers are coupled to the clutch output shaft. The clutching part includes a plurality of plate members that are configured to transmit and shut off torque between the clutch housing and the clutch centers. The pressure plate is configured to press the clutching part against the clutch center. The biasing member biases the pressure plate in a direction of pressing the clutching part. The clutch centers include a first clutch center and a second clutch center. The first clutch center is axially supported by the clutch output shaft in a relatively non-rotatable manner. The second clutch center is supported by the first clutch center in a relatively rotatable manner and holds the clutching part between the pressure plate and the second clutch center. The first clutch center and the second clutch center have a torque limiter mechanism and a torque limiter-disabling mechanism therebetween. The torque limiter mechanism is configured to transmit power between the first clutch center and the second clutch center and to reduce clutch torque by acting on the pressure plate due to relative rotation between the first clutch center and the second clutch center. The torque limiter-disabling mechanism is configured to inhibit operation of a torque limiter of the torque limiter mechanism by preventing relative rotation between the first clutch center and the second clutch center when power is transmitted from the first clutch center to the second clutch center in an acceleration direction.

In this structure, the first clutch center and the second clutch center have the torque limiter mechanism and the torque limiter-disabling mechanism therebetween. The torque limiter mechanism is configured to transmit power between the first clutch center and the second clutch center and to reduce clutch torque by acting on the pressure plate due to relative rotation between the first clutch center and the second clutch center when torque for transmitting power from the first clutch center to the second clutch center acts. The torque limiter-disabling mechanism is configured to inhibit operation of the torque limiter of the torque limiter mechanism by preventing relative rotation between the first clutch center and the second clutch center when power is transmitted from the first clutch center to the second clutch center in an acceleration direction.

When power is transmitted from the first clutch center to the second clutch center in an acceleration direction in the state in which the clutch output shaft is stopped or is operated in a low-rotation range, the torque limiter-disabling mechanism inhibits operation of the torque limiter mechanism by preventing relative rotation between the first clutch center and the second clutch center. Thus, it is possible to perform a push-start or a kick-start.

When power is transmitted from the second clutch center to the first clutch center in an acceleration direction, the torque limiter-disabling mechanism prevents the torque limiter from operating and does not inhibit relative rotation between the first clutch center and the second clutch center, irrespective of the number of rotations of the clutch output shaft. This structure enables avoiding stress from concentrating on a part of the torque limiter mechanism even when a great acceleration is applied to the second clutch center.

In one preferred embodiment of the present invention, the torque limiter-disabling mechanism may include a locking pin that is provided to the second clutch center. In this case, the locking pin is movably inserted in an insertion hole that is radially oriented, and the locking pin is biased in a rotation center direction by a pin-biasing member. When power is transmitted from the first clutch center to the second clutch center in a state in which the locking pin is protruded from the insertion hole toward a rotation axis center by a biasing force of the pin-biasing member, a locking part that is formed to the first clutch center locks to the locking pin that is protruded from the insertion hole, to prevent relative rotation between the first clutch center and the second clutch center.

In this structure, the locking pin is provided to the second clutch center. The locking pin is movably inserted in the insertion hole that is radially oriented, and the locking pin is biased in the rotation center direction by the pin-biasing member. The locking pin is protruded from the insertion hole toward the rotation axis center by the biasing force of the pin-biasing member when the clutch output shaft is stopped or is operated in a low-rotation range. On the other hand, the locking pin is moved in a centrifugal direction by a centrifugal force and retracts in the insertion hole when the clutch output shaft is operated in other rotation ranges. Thus, the structure is simple.

In the torque limiter-disabling mechanism, when the clutch output shaft is stopped or is operated in a low-rotation range, at the time power is transmitted from the first clutch center to the second clutch center in a state in which the locking pin is protruded from the insertion hole toward the rotation axis center by the biasing force of the pin-biasing member, the locking part that is formed to the first clutch center locks to the locking pin that is protruded from the insertion hole, to prevent relative rotation between the first clutch center and the second clutch center. As a result, the torque limiter of the torque limiter mechanism is prevented from operating, and a push-start or a kick-start can be performed.

In the torque limiter-disabling mechanism, when power is transmitted from the second clutch center to the first clutch center in an acceleration direction, the first clutch center does not lock to the locking pin, and relative rotation between the first clutch center and the second clutch center is not inhibited, irrespective of the number of rotations of the clutch output shaft. This structure enables avoiding stress from concentrating on a part to which the locking pin of the torque limiter-disabling mechanism locks, even when a great acceleration is applied to the second clutch center.

In one preferred embodiment of the present invention, the torque limiter mechanism may include elastic members that are interposed between the first clutch center and the second clutch center. The elastic members are configured to be compressed and deformed by relative rotation between the first clutch center and the second clutch center so as to transmit power. One of the elastic members is configured to be compressed and deformed when power is transmitted from the first clutch center to the second clutch center. The second clutch center has a side wall that faces the pressure plate and also has an opening part that penetrates axially, at a position facing the one elastic member of the side wall. Push rods are inserted and fitted in the opening part and are configured to be axially moved by compression deformation of the one elastic member so as to push the pressure plate.

In this structure, the elastic members are interposed between the first clutch center and the second clutch center. The elastic members are configured to be compressed and deformed by relative rotation between the first clutch center and the second clutch center so as to transmit power. The one elastic member is configured to be compressed and deformed only when power is transmitted from the first clutch center to the second clutch center. The second clutch center has the side wall that faces the pressure plate and also has the opening part that penetrates axially, at the position facing the one elastic member of the side wall. The push rods are inserted and fitted in the opening part and are configured to be axially moved by compression deformation of the one elastic member so as to push the pressure plate. This structure enables reducing clutch capacity at the time a great deceleration is applied.

In one preferred embodiment of the present invention, the first clutch center may be provided with a stopper part. The stopper part is configured to, when power is transmitted from the second clutch center to the first clutch center in an acceleration direction, stop relative rotation between the first clutch center and the second clutch center, which is performed via compression deformation of the elastic member between the second clutch center and the first clutch center, by making the second clutch center and the first clutch center come into contact with each other in response to the second clutch center and the first clutch center having a predetermined positional relationship as the relative rotation continues.

In this structure, when power is transmitted from the second clutch center to the first clutch center, the stopper part stops the relative rotation, which is performed via compression deformation of the elastic member between the second clutch center and the first clutch center, by making the second clutch center and the first clutch center come into contact with each other in response to the second clutch center and the first clutch center having a predetermined positional relationship as the relative rotation continues. With this structure, as the relative rotation continues, power is directly transmitted from the second clutch center to the first clutch center without using the elastic member, whereby responsiveness is improved.

In the present invention, the multiple-disc friction clutch having a torque limiter function is provided with the torque limiter-disabling mechanism that inhibits relative rotation between the first clutch center and the second clutch center when power is transmitted from the first clutch center to the second clutch center in an acceleration direction. Thus, it is possible to start an internal combustion engine by a push-start or the like.

DETAILED DESCRIPTION

Hereinafter, one embodiment according to the present invention will be described with reference to FIGS. 1 to 7.

Figure 1:
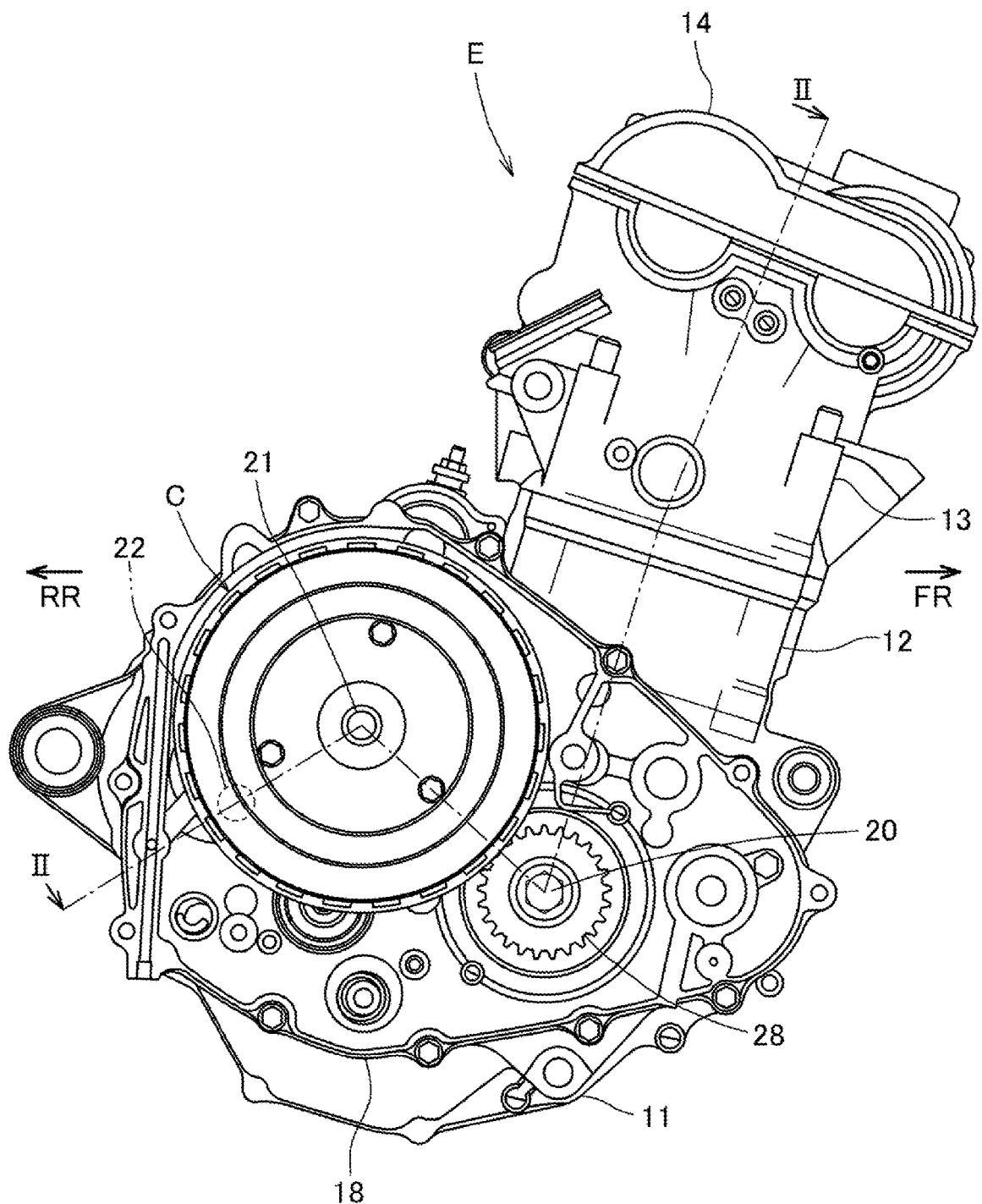
FIG. 1 is a partially omitted side view of the whole internal combustion engine according to one embodiment of the present invention, from which a right case cover is removed.
Figure 2:
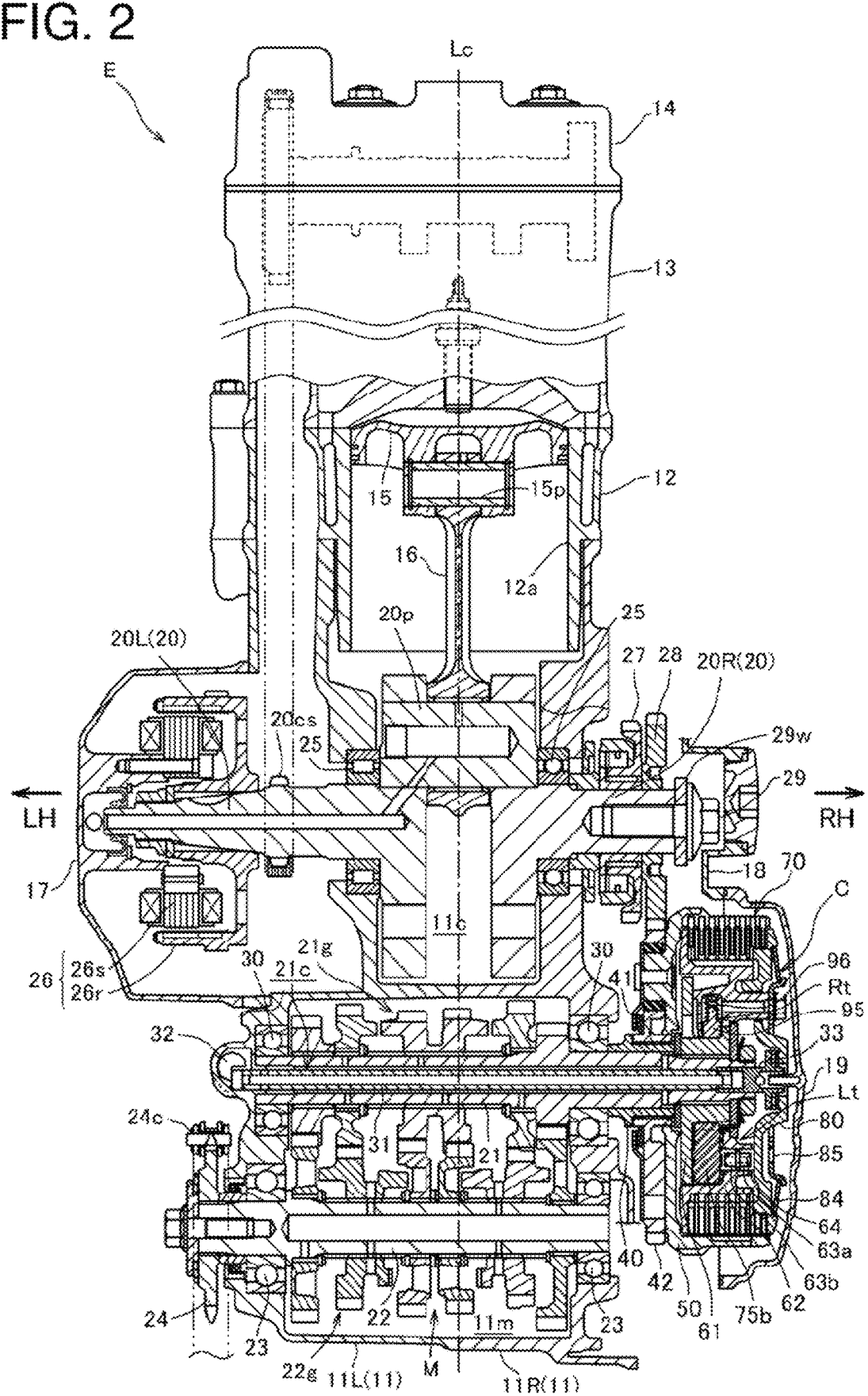
FIG. 2 is a cross-sectional development view of the internal combustion engine as seen from an arrow direction of a line II-II in FIG. 1.

FIG. 1 is a right side view of an internal combustion engine "E" of one embodiment using the present invention, from which a case cover is removed. FIG. 2 is a cross-sectional development view of the internal combustion engine "E" (cross-sectional development view as seen from an arrow direction of a line II-II in FIG. 1).

The internal combustion engine "E" is a single-cylinder four-stroke internal combustion engine to be mounted on a motorcycle.

In the description of this specification, the front-rear and the right-left directions follow the normal standard in which an advancing direction of a motorcycle 1 of this embodiment is a front direction. In the drawings, the reference signs "FR," "RR," "LH," and "RH" denote a front direction, a rear direction, a left-hand direction, and a right-hand direction, respectively.

A crankcase 11 is directed in a right-left vehicle-width direction of the motorcycle 1 and axially supports a crankshaft 20. The crankcase 11 forms a crank chamber 11c, in which the crankshaft 20 is disposed, and it also forms a transmission chamber 11m that houses a transmission "M," behind the crank chamber 11c.

The internal combustion engine "E" has an engine body above the crank chamber 11c of the crankcase 11. The engine body includes a cylinder block 12, a cylinder head 13, and a cylinder head cover 14. The cylinder block 12 has one cylinder 12a. The cylinder head 13 is fastened to the top of the cylinder block 12 by stud bolts via a gasket. The cylinder head cover 14 is joined to the top of the cylinder head 13.

The cylinder block 12, the cylinder head 13, and the cylinder head cover 14 that are stacked on the crankcase 11 extend upward from the crankcase 11, in the state of being slightly tilted forward.

In the transmission chamber 11m of the crankcase 11, a main shaft 21 and a countershaft 22 of the transmission "M" are disposed while being directed in a right-left horizontal direction in parallel to the crankshaft 20.

The crankcase 11 is divided at a plane including a cylinder axis Lc and being orthogonal to the crankshaft 20, into two right and left parts, that is, a pair of right crankcase 11R and left crankcase 11L, and they are joined in a state in which respective mating surfaces are fitted together.

The right and left crankcases 11R and 11L in a combined state form a circular opening above the crank chamber 11c. A lower part of the cylinder 12a of the cylinder block 12 is inserted into the circular opening, and a piston 15 is slidably fitted in a cylinder bore of the cylinder 12a in a reciprocatable manner.

The piston 15 and the crankshaft 20 are connected by a connecting rod 16 that is axially supported at a smaller end by a piston pin 15p of the piston 15 and at a larger end by a crank pin 20p of the crankshaft 20, whereby a crank mechanism is structured.

A left shaft body 20L that protrudes to the left side from a left main bearing 25 of the crankshaft 20 penetrates through a chain chamber and then further penetrates through an opening of a left side wall of the left crankcase 11L. The left shaft body 20L is formed with a drive cam chain sprocket 20cs at a part corresponding to the chain chamber and is fitted with an outer rotor 26r of an AC generator 26 at a left end.

A left side cover 17 closes the opening of the left side wall of the left crankcase 11L and covers the AC generator 26 while supporting an inner stator 26s of the AC generator 26.

On the other hand, a right shaft body 20R of the crankshaft 20 protrudes to the right side from a right main bearing 25 of the right crankcase 11R. A starter driven gear 27 and a primary drive gear 28 are fitted to the right shaft body 20R in this order from the main bearing 25 and are fixed by a flange bolt 29 via a washer 29w.

The transmission "M," which is disposed in the transmission chamber 11m behind the crank chamber 11c, includes a group of main gears 21g, a group of counter gears 22g, and a gear shift mechanism (not shown) of a shift drum and a shift fork operated by a gear shift control mechanism. The main gears 21g and the counter gears 22g are axially supported by the main shaft 21 and the countershaft 22, respectively.

The main shaft 21 is positioned obliquely above and rearward of the crankshaft 20 and is axially supported by the right and left crankcases 11R and 11L via bearings 30 and 30 in a rotatable manner. The main shaft 21 is provided with a multiple-disc friction clutch "C" at a part protruding to the right side from the right bearing 30.

The countershaft 22 is positioned obliquely above and rearward of the crankshaft 20 and is axially supported by the right and left crankcases 11R and 11L via bearings 23 and 23 in a rotatable manner. The countershaft 22 penetrates to the left side of the left bearing 23 and protrudes to the outside to function as an output shaft, and it is fitted with a drive chain sprocket 24 at a protruding left end.

A drive chain 24c is wound around the drive chain sprocket 24 and is also wound around a driven chain sprocket (not shown) on a rear wheel side, whereby power is transmitted to the rear wheel.

A right case cover 18 covers a right side surface of the right crankcase 11R and opens at the multiple-disc friction clutch "C." A clutch cover 19 covers a right side of the multiple-disc friction clutch "C" to close this opening.

The main shaft 21 is formed with a shaft hole 21c at the shaft center, and a clutch operation rod 31 is inserted into the shaft hole 21c.

The clutch operation rod 31 is slidably supported by right and left reduced-diameter parts of the shaft hole 21c and is moved to the right side in the axial direction by operation of a clutch cam 32 that acts on a left end.

In addition, the shaft hole 21c is supplied with oil that is ejected from a scavenge pump.

Figure 3:
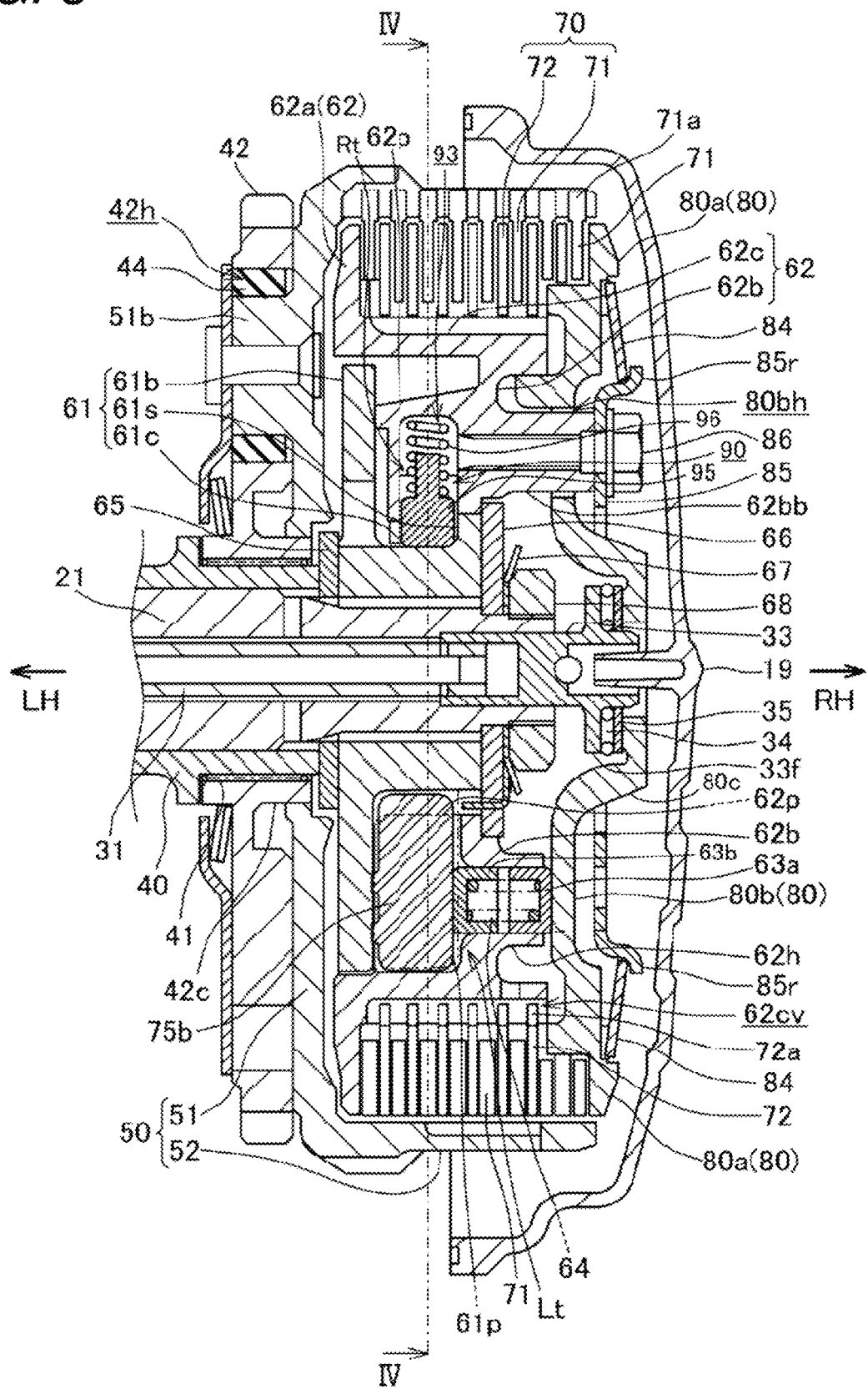
FIG. 3 is a sectional view of a multiple-disc friction clutch of the embodiment.

With reference to FIGS. 2 and 3, a sleeve member 40 is fitted onto the main shaft 21 in contact with an inner race of the right bearing 30 from a right side, and it axially supports a primary driven gear 42 via a needle bearing 41 in a rotatable manner.

The primary driven gear 42 meshes with the primary drive gear 28, which is fitted to the crankshaft 20.

A clutch housing 50 of the multiple-disc friction clutch "C" has a housing side wall 51 that is axially supported by the main shaft 21 in a rotatable manner, and a plurality of engaging protrusion pieces 52 protrude to the right side in the axial direction from an outer circumferential edge of the housing side wall 51.

The plurality of engaging protrusion pieces 52 are arranged at intervals in the circumferential direction.

This housing side wall 51 of the clutch housing 50 is axially supported by a center cylindrical boss 42c of the primary driven gear 42 while being in contact with a disc part of the primary driven gear 42.

A damper rubber 44 is press-fitted and held by an outer circumference of a holding boss 51b that protrudes on an outer surface of the housing side wall 51. The damper rubber 44 is inserted into a circular hole 42h that is formed in the disc part of the primary driven gear 42, so as to absorb rapid variations in torque between the primary driven gear 42 and the clutch housing 50.

Thus, rotation of the crankshaft 20 is transmitted to rotation of the clutch housing 50 of the multiple-disc friction clutch "C" via meshing between the primary drive gear 28 and the primary driven gear 42 and via the damper rubber 44.

The multiple-disc friction clutch "C" includes a clutch center that has a first clutch center 61 and a second clutch center 62. The first clutch center 61 is spline-fitted to a right end part of the main shaft 21, which is a clutch output shaft. The second clutch center 62 is supported by the first clutch center 61 in a relatively rotatable manner.

Figure 4:
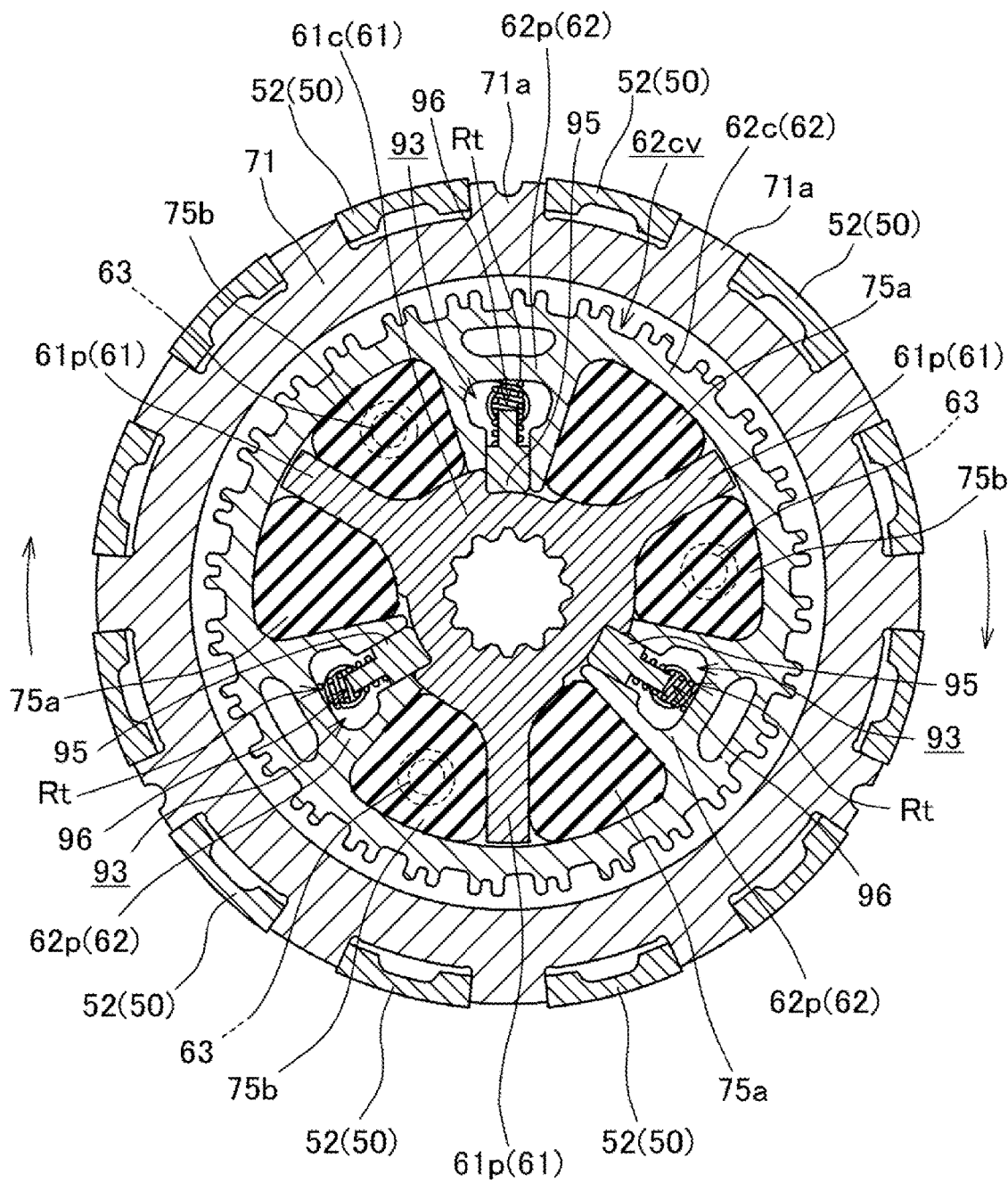
FIG. 4 is a sectional view of the multiple-disc friction clutch as seen from an arrow direction of a line IV-IV in FIG. 3.

With reference to FIGS. 3 and 4, the first clutch center 61 has a clutch-center side wall 61b, a clutch-center cylindrical boss 61c, and three pressing partition walls 61p. The clutch-center side wall 61b has a hollow disc shape and faces an inner surface of the housing side wall 51. The clutch-center cylindrical boss 61c cylindrically extends from an inner circumferential edge of the clutch-center side wall 61b to a side (right side) opposite to the housing side wall 51. The pressing partition walls 61p extend to the right side from the clutch-center side wall 61b as well as extend radially outward from the clutch-center cylindrical boss 61c.

The three pressing partition walls 61p extend at equal intervals in the circumferential direction and partition a right space of the clutch-center side wall 61b into three fan-shaped spaces (refer to FIG. 4).

Spline grooves are formed in an inner circumferential surface of the clutch-center cylindrical boss 61c.

In addition, a support protrusion 61s radially protrudes at each of three positions between the three pressing partition walls 61p, at a right end of the clutch-center cylindrical boss 61c.

The three support protrusions 61s have the same protrusion length and have tips at equal distances from a center axis.

This first clutch center 61 is spline-fitted and is axially supported by the right end part of the main shaft 21 in a relatively non-rotatable manner while being held between washers 65 and 66.

The first clutch center 61 is fitted to the main shaft 21 by screwing and fastening a nut 68 to a right end of the main shaft 21 via a lock washer 67.

On the other hand, the second clutch center 62 has a clutch-center cylindrical part 62c with an inner diameter slightly greater than an outer diameter of the clutch-center side wall 61b of the first clutch center 61. A right end part of the clutch-center cylindrical part 62c radially inwardly extends to form a clutch-center inner side wall 62b having a hollow disc shape, at a position facing the clutch-center side wall 61b of the first clutch center 61. A left end part of the clutch-center cylindrical part 62c radially outwardly extends to form a clutch-center outer side wall 62a having a hollow disc shape, at an outer circumference of the clutch-center side wall 61b of the first clutch center 61.

The plurality of engaging protrusion pieces 52, which are arranged in the circumferential direction of the clutch housing 50, are positioned on a concentric circle separated outward from the clutch-center cylindrical part 62c of the second clutch center 62 by a predetermined distance.

That is, an annular space is formed between the clutch-center cylindrical part 62c and the plurality of engaging protrusion pieces 52 that concentrically overlap each other, and the clutch-center outer side wall 62a is positioned on a left side in this annular space.

A plurality of groove lines 62cv are formed in the circumferential direction so as to be directed in the axial direction, in an outer circumferential surface of the clutch-center cylindrical part 62c of the second clutch center 62.

A plurality of friction plates 71 and a plurality of clutch plates 72 are alternately inserted and fitted in the annular space between the clutch-center cylindrical part 62c and the plurality of engaging protrusion pieces 52 that concentrically overlap each other, whereby they constitute a clutching part 70.

The friction plate 71 has a plurality of outer circumferential protrusions 71a that are formed on an outer circumferential edge. The outer circumferential protrusions 71a are fitted into spaces between the plurality of engaging protrusion pieces 52 of the clutch housing 50, in an axially slidable manner (refer to FIGS. 3 and 4). Thus, the friction plate 71 rotates together with the clutch housing 50.

On the other hand, the clutch plate 72 has a plurality of inner circumferential protrusions 72a that are formed on an inner circumferential edge. The inner circumferential protrusions 72a slidably engage with the plurality of groove lines 62cv, which are formed in the circumferential direction so as to be directed in the axial direction in the outer circumferential surface of the clutch-center cylindrical part 62c of the second clutch center 62 (refer to FIG. 3). Thus, the clutch plate 72 rotates together with the second clutch center 62.

The clutch-center inner side wall 62b of the second clutch center 62 faces the clutch-center side wall 61b of the first clutch center 61 and has three pressing partition parts 62p that extend to the left side from the clutch-center inner side wall 62b as well as extend radially inward from the clutch-center cylindrical part 62c.

The three pressing partition parts 62p extend at equal intervals in the circumferential direction and partition a left space of the clutch-center inner side wall 62b into three fan-shaped spaces (refer to FIG. 4).

As shown in FIG. 4, there is an annular space between the clutch-center side wall 61b of the first clutch center 61 and the clutch-center inner side wall 62b of the second clutch center 62, which face each other, and between the clutch-center cylindrical boss 61c and the clutch-center cylindrical part 62c, which concentrically overlap each other. This annular space is approximately equally partitioned into six spaces by the three pressing partition walls 61p of the first clutch center 61 and the three pressing partition parts 62p of the second clutch center 62, which are alternately disposed in the circumferential direction, and rubber dampers 75a and 75b are interposed in these six spaces.

Thus, as shown in FIG. 4, each of the rubber dampers 75a and 75b is held between the pressing partition wall 61p of the first clutch center 61 and the pressing partition part 62p of the second clutch center 62 and has a fan shape, in an axial view.

With reference to FIG. 4, the rotation direction of the multiple-disc friction clutch "C" is as shown by the arrows.

The rubber dampers 75a and 75b are alternately disposed in the circumferential direction. Among them, in terms of the rotation direction shown by the arrows, each of three rubber dampers 75a is held between the pressing partition part 62p of the second clutch center 62 on the upstream side and the pressing partition wall 61p of the first clutch center 61 on the downstream side, whereas each of three rubber dampers 75b is held between the pressing partition wall 61p of the first clutch center 61 on the upstream side and the pressing partition part 62p of the second clutch center 62 on the downstream side.

As shown in FIG. 3, the second clutch center 62 is supported in a relatively rotatable manner in a state in which inner circumferential surfaces of the three pressing partition parts 62p are in sliding contact with outer circumferential surfaces of the three support protrusions 61s of the first clutch center 61.

In addition, with reference to FIG. 3, the inner circumferential surface of the pressing partition part 62p, which is in sliding contact with the outer circumferential surface of the support protrusion 61s of the first clutch center 61, is positioned on the radially inside and on the left side of an outer circumferential surface of the washer 66 having a larger diameter than the inner circumferential surface of the pressing partition part 62p, whereby the second clutch center 62 is limited in movement to the right side. Moreover, a left end surface of the pressing partition part 62p is in contact with the clutch-center side wall 61b of the first clutch center 61, whereby the second clutch center 62 is also limited in movement to the left side.

A cylindrical bolt attaching boss 62bb having a bolt hole is formed at each of three parts having respective pressing partition parts 62p of the clutch-center inner side wall 62b of the second clutch center 62, in such a manner as to protrude to the right side. Each of the three pressing partition parts 62p is provided with a torque limiter-disabling mechanism Rt (described later).

Moreover, the clutch-center inner side wall 62b of the second clutch center 62 is formed with a cylindrical opening part 62h that penetrates in the axial direction, at each of parts facing the three rubber dampers 75b, which are each held between the pressing partition wall 61p of the first clutch center 61 on the upstream side and the pressing partition part 62p of the second clutch center 62 on the downstream side, among the six interposed rubber dampers 75a and 75b.

A first push rod 63a for pushing a pressure plate 80 and a second push rod 63b for being in pressure contact with the rubber damper 75b are axially movably inserted and fitted in the cylindrical opening part 62h, which is formed to the clutch-center inner side wall 62b of the second clutch center 62.

The first push rod 63a and the second push rod 63b each have a bottomed cylindrical shape, and they are inserted and fitted in the cylindrical opening part 62h while openings thereof face each other. A coil spring 64 is compressed and interposed between the first push rod 63a and the second push rod 63b.

The first push rod 63a and the second push rod 63b are inserted and fitted in each of the three cylindrical opening parts 62h, which are at equal intervals in the circumferential direction of the clutch-center inner side wall 62b of the second clutch center 62.

The clutch-center outer side wall 62a of this second clutch center 62 faces the clutching part 70, in which the plurality of friction plates 71 and the plurality of clutch plates 72 are alternately inserted and fitted, and a pressure plate 80 and this clutch-center outer side wall 62a hold the clutching part 70 therebetween while the pressure plate 80 presses the clutching part 70.

The pressure plate 80 has a disc shape, and an outer circumferential side wall 80a presses the plurality of alternately stacked friction plates 71 and clutch plates 72, against the clutch-center outer side wall 62a, from a right side.

The center of the pressure plate 80 is expanded to the right side to form a center boss 80c, and the pressure plate 80 continues to the outer circumferential side wall 80a via an inner circumferential side wall 80b that radially extends from the center boss 80c.

With reference to FIG. 3, a cap member 33 covers an end (right end) of the clutch operation rod 31 and protrudes from a shaft end of the main shaft 21 to form a flange 33f. This flange 33f faces an annular side plate 35 that is abutted on the center boss 80c of the pressure plate 80, whereby the flange 33f and the annular side plate 35 hold a thrust bearing 34 therebetween.

The inner circumferential side wall 80b of the pressure plate 80 faces the clutch-center inner side wall 62b of the second clutch center 62 and is formed with a circular hole 80bh for passing each of the three bolt attaching bosses 62bb, which are formed so as to protrude to the right side from the clutch-center inner side wall 62b.

A set plate 85 is abutted to a right end surface of each of the three bolt attaching bosses 62bb that penetrate to protrude from the inner circumferential side wall 80b of the pressure plate 80, and a bolt 86 is tightened to each of the three bolt attaching bosses 62bb.

The set plate 85 is provided with an opening from which the center boss 80c of the pressure plate 80 protrudes to the right side.

In addition, the number of the bolts can be changed as appropriate and may be six or another number instead of three.

A disc spring 84 is compressed and interposed between a spring receiving part 85r that is bent at an outer circumferential edge of the set plate 85, and a back surface (right side surface) of the outer circumferential side wall 80a of the pressure plate 80.

Thus, the pressure plate 80 is biased axially inward (to the left side) by the spring force of the disc spring 84, and the outer circumferential side wall 80a of the pressure plate 80 and the clutch-center outer side wall 62a press and hold the alternately stacked friction plates 71 and clutch plates 72 therebetween. Under these conditions, rotation of the clutch housing 50 is transmitted to the second clutch center 62 via the friction plates 71 and the clutch plates 72 that are in pressure contact with each other, that is, the clutch is engaged.

In response to the clutch operation rod 31 moved to the right side by the action of the clutch cam 32, the pressure plate 80 is pushed to the right side via the cap member 33 and the thrust bearing 34 and is moved to the right side against the biasing force of the disc spring 84. Then, the friction plates 71 and the clutch plates 72 in the state of being pressed and held between the pressure plate 80 and the clutch-center outer side wall 62a are released. Under these conditions, rotation of the clutch housing 50 is not transmitted to the second clutch center 62, that is, the clutch is disengaged.

The clutch may be a hydraulic pressure type.

With reference to FIG. 4, when rotation of the clutch housing 50 is transmitted to the second clutch center 62 in the state in which the clutch is engaged, rotation of the second clutch center 62 makes the pressing partition part 62p of the second clutch center 62 on the upstream side approach the pressing partition wall 61p of the first clutch center 61 on the downstream side to press and hold the rubber damper 75a. Thus, rotation of the second clutch center 62 is transmitted to rotation of the first clutch center 61 via the rubber damper 75a that is held in a pressed state, whereby power is transmitted.

On the other hand, in the state in which the clutch is engaged, when rotation of the main shaft 21 is transmitted to the first clutch center 61, that is, when back torque acts, rotation of the first clutch center 61 makes the pressing partition wall 61p of the first clutch center 61 on the upstream side approach the second clutch center 62 on the downstream side to press and hold the rubber damper 75b. Thus, rotation of the first clutch center 61 is transmitted to rotation of the second clutch center 62 via the rubber damper 75b that is held in a pressed state, whereby power is transmitted.

In this manner, power is transmitted between the first clutch center 61 and the second clutch center 62 via the rubber dampers 75a and 75b. Nevertheless, elastic deformation of the rubber dampers 75a and 75b causes a very little delay in response, which hardly affects operability. The responsiveness is able to be adjusted by a filling rate of the dampers.

In addition, vibrations due to relative rotation between the first clutch center 61 and the second clutch center 62 are reduced by damping forces of the rubber dampers 75a and 75b.

Figure 5:
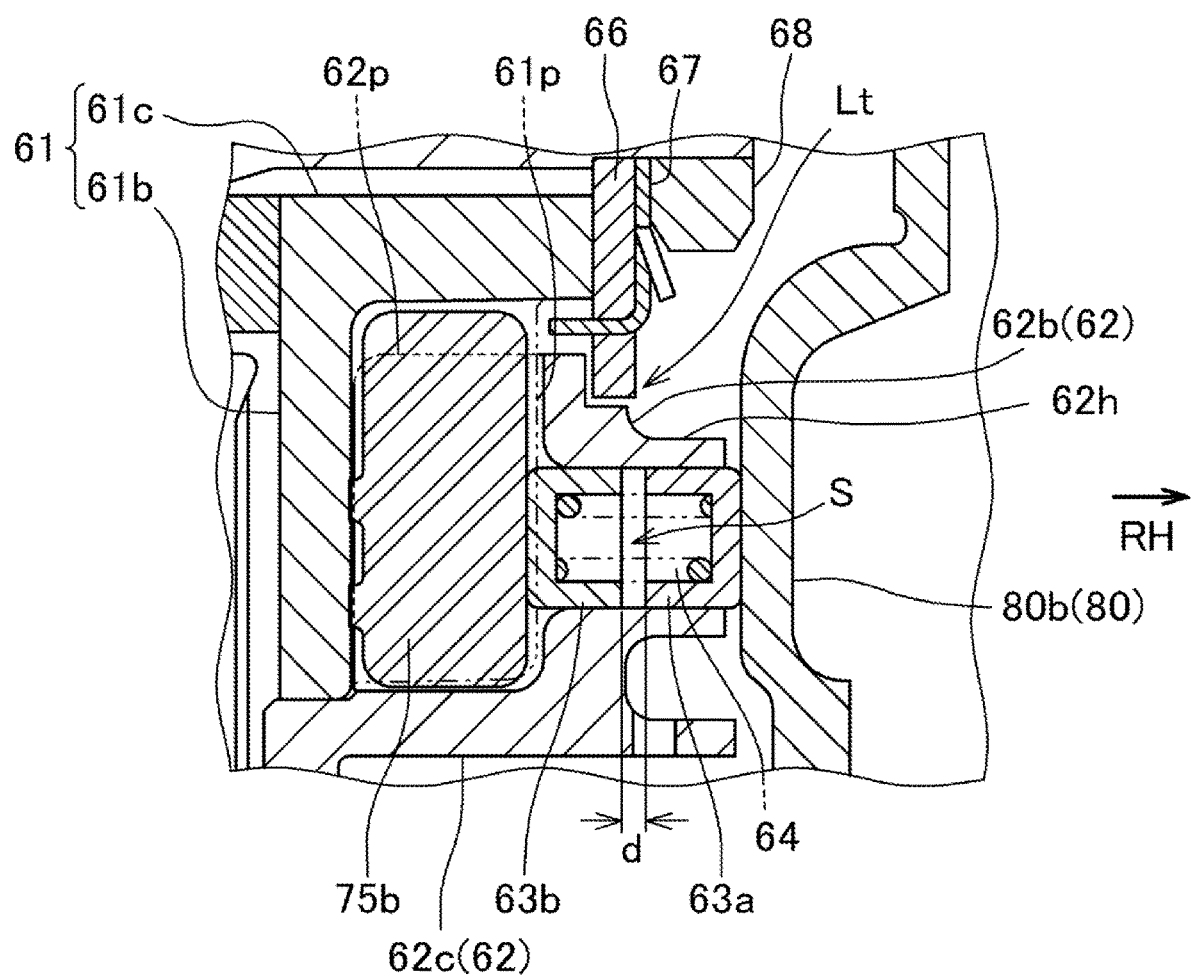
FIG. 5 is a partial sectional view showing a torque limiter mechanism of the multiple-disc friction clutch.

The rubber damper 75b may not be held in a pressed state, and it may not be compressed and deformed. In this state, as shown in FIG. 5, in accordance with biasing of the coil spring 64, the first push rod 63a contacts and pushes the pressure plate 80, whereas the second push rod 63b is in pressure contact with the rubber damper 75b. Thus, the first push rod 63a and the second push rod 63b are spaced in a contactable manner by the coil spring 64 that is interposed therebetween in a compressed state, and a gap "S" with a distance "d" is formed therebetween.

Figure 6:
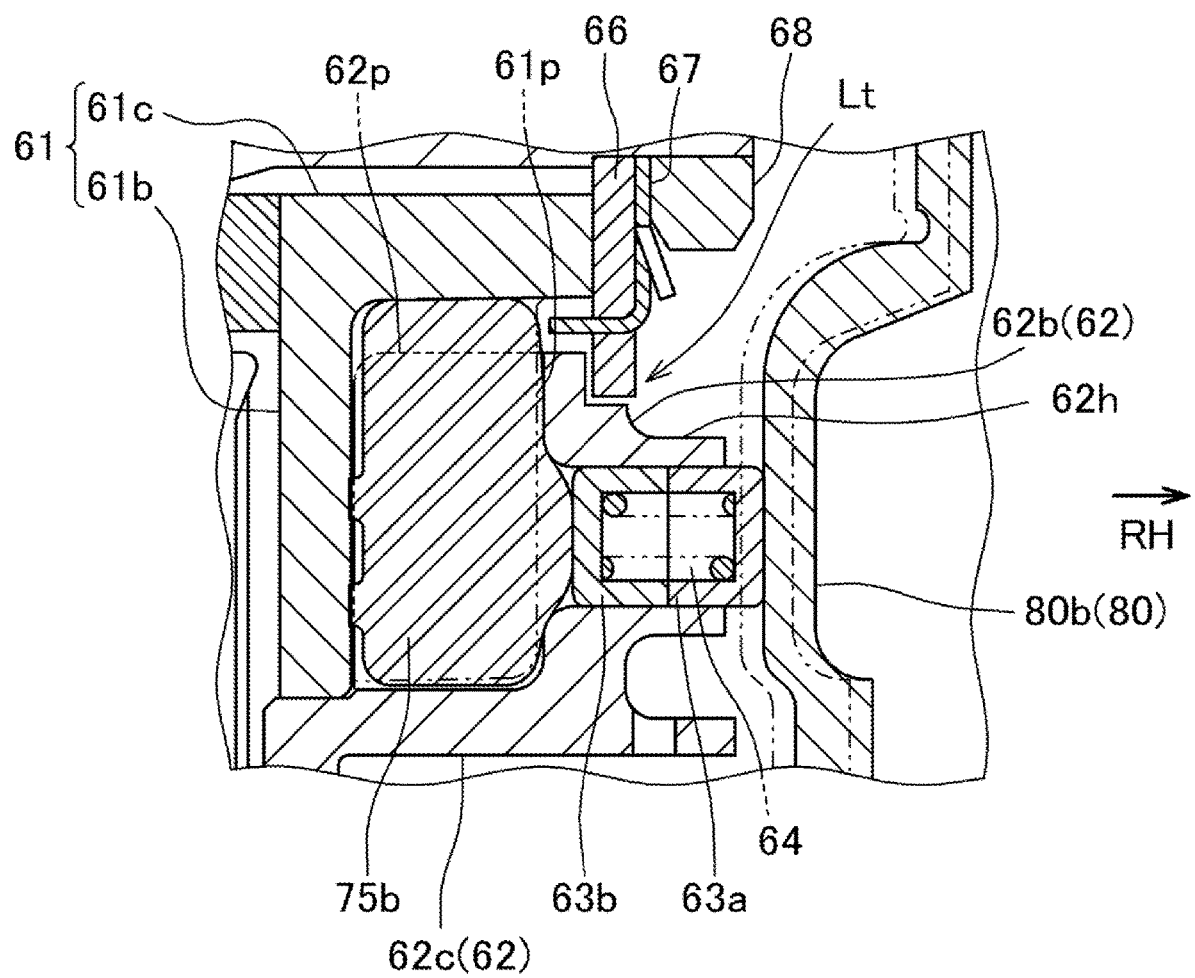
FIG. 6 is a partial sectional view showing the torque limiter mechanism of the multiple-disc friction clutch in another state.

Upon being held in a pressed state, the rubber damper 75b is compressed and deformed to expand to the cylindrical opening part 62h, as shown in FIG. 6. The rubber damper 75b then pushes the second push rod 63b against the biasing force of the coil spring 64 to eliminate the gap "S" and brings the second push rod 63b into contact with the first push rod 63a.

In response to action of a great back torque, the second push rod 63b comes into contact with the first push rod 63a and then further moves to the right side together with the first push rod 63a and the pressure plate 80.

Movement to the right side of the pressure plate 80 loosens the friction plates 71 and the clutch plates 72 in the state of being pressed and held between the pressure plate 80 and the clutch-center outer side wall 62a, resulting in a reduction in clutch capacity.

With this structure, at the time a great torque acts due to engine braking or the like, it is possible to reduce clutch capacity and prevent rapid braking from acting on a tire (torque limiter mechanism).

With reference to FIG. 4, the first and second push rods 63a and 63b are inserted and fitted in each of the three cylindrical opening parts 62h, which are provided at equal intervals in the circumferential direction of the clutch-center inner side wall 62b of the second clutch center 62. In this structure, in response to protrusion of the three sets of the first and second push rods 63a and 63b, which are disposed at equal intervals in the circumferential direction (shown by the imaginary lines in FIG. 4), forces of the first and second push rods 63a and 63b for pushing back the pressure plate 80 against the biasing force of the disc spring 84 are uniformly applied to the pressure plate 80 and thereby smoothly moves the pressure plate 80.

As shown in FIG. 5, due to biasing of the coil spring 64, the first push rod 63a contacts and pushes the pressure plate 80, whereas the second push rod 63b is in pressure contact with the rubber damper 75b. In this structure, it is possible to adjust operation responsiveness of the pressure plate 80 relative to compression deformation of the rubber damper 75b.

In this manner, the first clutch center 61 and the second clutch center 62 transmit power therebetween via the rubber dampers 75a and 75b and are provided with a torque limiter mechanism Lt that operates as follows. When a great back torque is applied, the rubber damper 75b is held in a pressed state, and it is thereby compressed and deformed. Then, the rubber damper 75b moves the first push rod 63a together with the second push rod 63b to push the pressure plate 80 to the right side, resulting in a reduction in clutch capacity.

As shown in FIG. 5, the gap "S" is provided between the first push rod 63a and the second push rod 63b. The gap "S" between the first push rod 63a and the second push rod 63b absorbs movement thereof, which is based on compression deformation of the rubber damper 75b. With this structure, even when rapid relative rotation between the first clutch center 61 and the second clutch center 62 is repeated while variations in torque are great during deceleration, clutch capacity can be reduced without causing vibratory movement of the pressure plate 80.

As a result, it is possible to reduce vibrations of a clutch lever due to vibrations of the pressure plate, when the torque limiter operates.

The torque limiter mechanism Lt of the multiple-disc friction clutch of the above-described embodiment can be easily adjusted in clutch capacity by exchanging the rubber damper for an elastic member being different in modulus of elasticity, dimensions, and shape, or by exchanging the push rod for one having a different length.

As the force for pushing the pressure plate 80 to the right side of the first push rod 63a is decreased, the biasing force for biasing the pressure plate 80 to the left side of the disc spring 84 exceeds it, whereby clutch capacity is quickly returned to the original level.

The multiple-disc friction clutch "C" is provided with a torque limiter-disabling mechanism Rt for the torque limiter mechanism Lt. The torque limiter-disabling mechanism Rt disables the torque limiter of the torque limiter mechanism Lt when the main shaft 21 is stopped or is operated in a low-rotation range of not greater than an idling speed.

Figure 7:
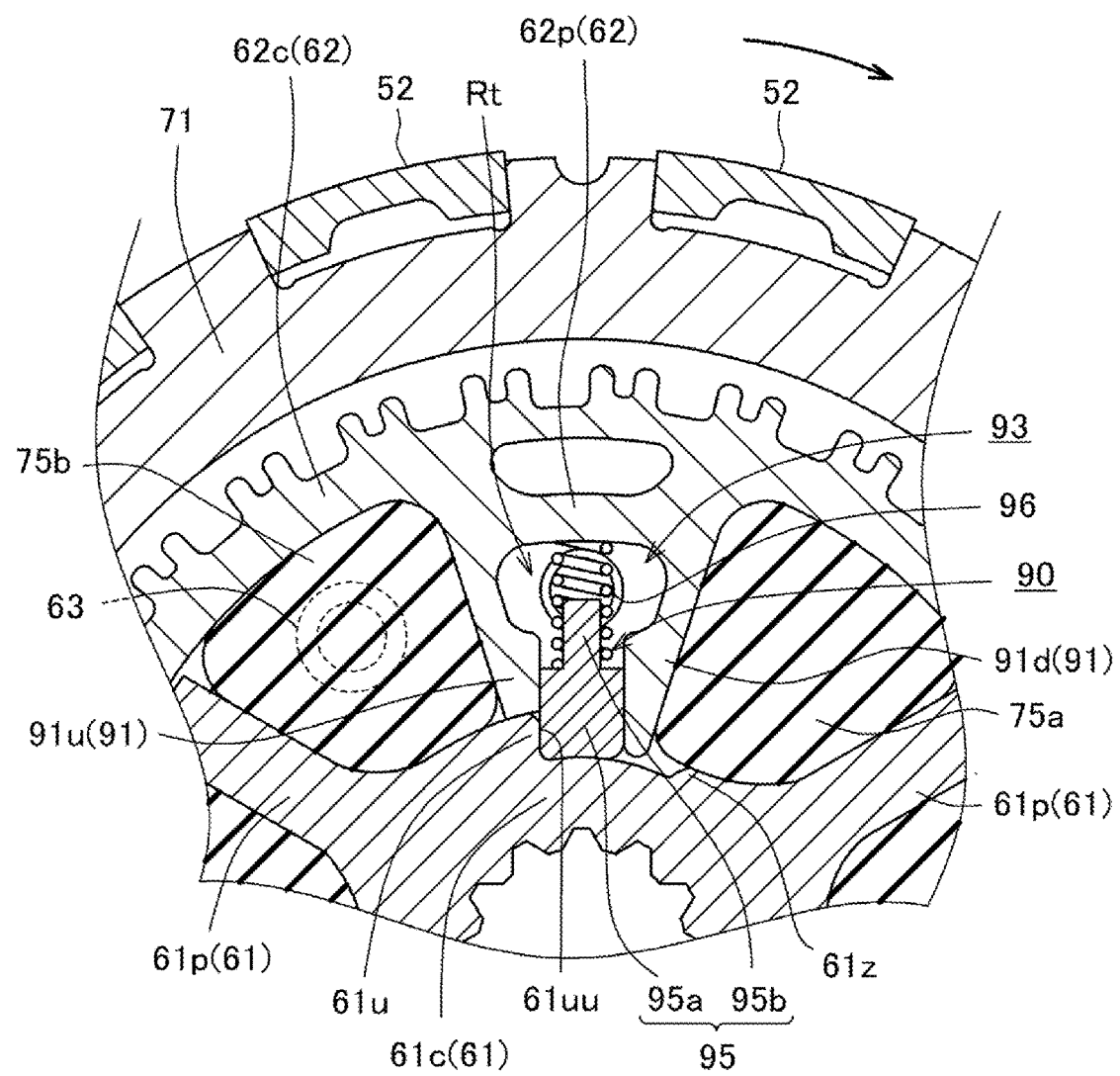
FIG. 7 is a partial sectional view showing a torque limiter-disabling mechanism of the multiple-disc friction clutch.

With reference to FIGS. 3, 4, and 7, the torque limiter-disabling mechanism Rt is provided so as to radially face both of the pressing partition part 62p of the second clutch center 62 and the clutch-center cylindrical boss 61c between two pressing partition walls 61p of the first clutch center 61.

With reference to FIG. 7, an insertion hole 90 is formed by radially perforating the center of the pressing partition part 62p, which extends radially inward from the clutch-center cylindrical part 62c of the second clutch center 62.

The insertion hole 90 penetrates from an inner circumferential surface on a radially inside to a radially inner hollow 93 of the pressing partition part 62p.

A locking pin 95 is radially movably inserted and fitted in the insertion hole 90 of the pressing partition part 62p.

The locking pin 95 has such a shape that a reduced-diameter part 95b protrudes from a columnar pin body 95a, and the pin body 95a is inserted and fitted in the insertion hole 90 in the state in which the reduced-diameter part 95b faces the hollow 93.

Thus, the pin body 95a of the locking pin 95 is able to project from and retract in the insertion hole 90.

A coil spring 96 that is supported by the reduced-diameter part 95b is interposed between the pin body 95a of the locking pin 95 and a wall surface on an outer circumferential side of the hollow 93. The coil spring 96 biases the locking pin 95 to the radially inside.

A circumferential wall 91 defines the insertion hole 90 of the pressing partition part 62p in the inside thereof and has an upstream circumferential wall part 91u on an upstream side and a downstream circumferential wall part 91d on a downstream side in the rotation direction of the second clutch center 62. The upstream circumferential wall part 91u and the downstream circumferential wall part 91d differ from each other in the radial length, and specifically, the downstream circumferential wall part 91d is longer than the upstream circumferential wall part 91u.

On the other hand, the clutch-center cylindrical boss 61c of the first clutch center 61, which the circumferential wall 91 of the pressing partition part 62p faces on a radially inside, is formed with a locking part 61u that protrudes radially outward. FIG. 7 shows a relative positional relationship between the first clutch center 61 and the second clutch center 62 when the main shaft 21, which is a clutch output shaft, is stopped. Under these conditions, the locking part 61u protrudes to face and approach the upstream circumferential wall part 91u, which is one constituting the circumferential wall 91 and being shorter than the downstream circumferential wall part 91d.

In this manner, the torque limiter-disabling mechanism Rt is structured so as to radially face both of the pressing partition part 62p of the second clutch center 62 and the clutch-center cylindrical boss 61c of the first clutch center 61. The torque limiter-disabling mechanisms Rt are provided at three positions in the circumferential direction.

As shown in FIG. 7, the locking part 61u, which protrudes toward the upstream circumferential wall part 91u, has a smooth sloped surface on an upstream side, but it is cut out on a downstream side so as to have a downstream circumferential surface 61uu that has the same shape as an inner circumferential surface of the upstream circumferential wall part 91u.

The locking pin 95, which is inserted and fitted in the insertion hole 90 formed in the pressing partition part 62p of the second clutch center 62, is biased by the coil spring 96 and protrudes radially inward. In this state, the pin body 95a is in contact with an outer circumferential surface of the clutch-center cylindrical boss 61c of the first clutch center 61. A downstream outer circumferential surface of the pin body 95a is in contact with only an inner circumferential surface of the downstream circumferential wall part 91d of the insertion hole 90 of the second clutch center 62. On the other hand, an upstream outer circumferential surface of the pin body 95a is in contact with both of an inner circumferential surface of the upstream circumferential wall part 91u of the insertion hole 90 of the second clutch center 62 and the downstream circumferential surface 61uu of the locking part 61u of the first clutch center 61, at the same time.

In this manner, when the main shaft (clutch output shaft) 21 is stopped, the first clutch center 61 and the second clutch center 62 have a relative positional relationship shown in FIG. 7, in the state in which the locking pin 95 is biased by the coil spring 96 and protrudes from the insertion hole 90 of the second clutch center 62 to the radially inside (toward the rotation axis center).

Operation of this structure when the main shaft (clutch output shaft) 21 is stopped, is described below with reference to FIG. 7. At the time power is transmitted from the second clutch center 62 to the first clutch center 61, the first clutch center 61 does not lock to the locking pin 95 that protrudes. Conversely, at the time power is transmitted from the first clutch center 61 to the second clutch center 62, the locking part 61u of the first clutch center 61 locks to the locking pin 95 that protrudes from the insertion hole 90 and inhibits relative rotation between the first clutch center 61 and the second clutch center 62.

Similarly, when the main shaft (clutch output shaft) 21 rotates at low speed of not greater than an idling speed, although the locking pin 95 moves to a centrifugal side against the biasing force of the coil spring 96 due to a centrifugal force, the movement amount is small, and the locking part 61u, which is formed to the first clutch center 61, still locks to the locking pin 95. Thus, at the time power is transmitted from the first clutch center 61 to the second clutch center 62, relative rotation therebetween is inhibited.

In more detail, when the main shaft (clutch output shaft) 21 is stopped or is operated in a low-rotation range, at the time power is transmitted from the first clutch center 61 on the clutch output shaft side to the second clutch center 62 (e.g., at the time of performing a push-start), the locking part 61u of the first clutch center 61 locks to the locking pin 95 that protrudes from the insertion hole 90 of the second clutch center 62. Thus, relative rotation between the first clutch center 61 and the second clutch center 62 is inhibited. As a result, at the time power is transmitted from the first clutch center 61 to the second clutch center 62, reduction in clutch capacity due to relative rotation therebetween in the torque limiter mechanism Lt is prevented, whereby the torque limiter of the torque limiter mechanism Lt does not operate.

When the main shaft (clutch output shaft) 21 is stopped or is operated in a low-rotation range, the torque limiter-disabling mechanism Rt prevents the torque limiter of the torque limiter mechanism Lt from operating and inhibits relative rotation between the first clutch center 61 and the second clutch center 62, resulting in avoiding a reduction in clutch capacity. This enables smoothly starting an internal combustion engine by a kick-start or a push-start.

In the torque limiter-disabling mechanism Rt, when the main shaft (clutch output shaft) 21 is stopped or is operated in a low-rotation range, at the time power is transmitted from the second clutch center 62 to the first clutch center 61, the first clutch center 61 does not lock to the locking pin 95 that protrudes, and relative rotation between the first clutch center 61 and the second clutch center 62 is not inhibited. Under these conditions, even when a great acceleration is applied to the second clutch center 62 while the main shaft (clutch output shaft) 21 is stopped or is operated in a low-rotation range, the first clutch center 61 does not lock to the locking pin 95 that protrudes, whereby it is possible to prevent stress from concentrating on a part of the torque limiter-disabling mechanism Rt.

Moreover, when the main shaft (clutch output shaft) 21 is stopped or is operated in a low-rotation range, the great acceleration acting on the second clutch center 62 is able to be absorbed by compression deformation of the rubber damper 75a, and stress can be dispersed. Thus, constituent members are not required to have high strength, and a complicated structure for dispersing stress is not necessary, whereby it is possible to manufacture a multiple-disc friction clutch having a simple structure and being light in weight, at low cost.

In contrast, when the main shaft (clutch output shaft) 21 comes to rotate in a rotation range exceeding an idling speed, which is higher than the low-rotation range, the locking pin 95 greatly moves to the centrifugal side against the biasing force of the coil spring 96 due to a centrifugal force, and it retracts in the insertion hole 90 of the pressing partition part 62p of the second clutch center 62. In this state, relative rotation can be performed in accordance with power from either one of the first clutch center 61 and the second clutch center 62, and power is transmitted via the rubber dampers 75a and 75b.

When the main shaft (clutch output shaft) 21 is operated in a rotation range higher than a low-rotation range, the locking pin 95 retracts in the insertion hole 90 of the second clutch center 62 due to a centrifugal force. Under these conditions, the torque limiter-disabling mechanism Rt prevents the torque limiter from operating, and therefore, the torque limiter mechanism Lt operates to reduce clutch capacity when an excessive torque is applied to the first clutch center 61.

With reference to FIG. 7, which shows the relative positional relationship between the first clutch center 61 and the second clutch center 62 during stop of the main shaft (clutch output shaft) 21, the multiple-disc friction clutch has a stopper part 61z. The stopper part 61z is formed by protruding the outer circumferential surface of the clutch-center cylindrical boss 61c, in the vicinity of an upstream root of the pressing partition wall 61p of the first clutch center 61 on the downstream side of the pressing partition part 62p of the second clutch center 62.

The distance from the center of the main shaft 21 of the stopper part 61z of the first clutch center 61 is greater than that of the downstream circumferential wall part 91d of the circumferential wall 91, which defines the insertion hole 90 in the inside of the pressing partition part 62p of the second clutch center 62.

This structure operates as follows when a great acceleration is applied to the second clutch center 62 in the state shown in FIG. 7, which shows the relative positional relationship between the first clutch center 61 and the second clutch center 62 during stop of the main shaft (clutch output shaft) 21. The pressing partition part 62p of the second clutch center 62 approaches the pressing partition wall 61p of the first clutch center 61 to compress and deform the rubber damper 75a. As relative rotation continues, the downstream circumferential wall part 91d of the pressing partition part 62p of the second clutch center 62 comes into contact with the stopper part 61z of the first clutch center 61 to stop the relative rotation. Under these conditions, power can be directly transmitted from the second clutch center 62 to the first clutch center 61 without using the rubber damper 75a. With this structure, it is possible to set responsiveness variously by changing the type of the rubber damper.

Although the multiple-disc friction clutch of the one embodiment of the present invention is described above, embodiments of the present invention are not limited to the foregoing embodiment and also include those implemented in various forms within the gist of the present invention.

The present invention can also be used in a torque limiter mechanism as follows. Specifically, for example, a cam mechanism is structured between the first clutch center and the second clutch center. When back torque is applied, the cam mechanism operates by relative rotation between the first clutch center and the second clutch center, and it axially moves the second clutch center to push the pressure plate, resulting in disengagement of frictional connection of the clutching part.

REFERENCE SIGNS LIST

E . . . internal combustion engine
M . . . transmission
C . . . multiple-disc friction clutch
Lt . . . torque limiter mechanism
Rt . . . torque limiter-disabling mechanism
1 . . . motorcycle
20 . . . crankshaft
21 . . . main shaft (clutch output shaft)
22 . . . countershaft
28 . . . primary drive gear
30 . . . bearing
31 . . . clutch operation rod
32 . . . clutch cam
33 . . . cap member
33$f$ . . . flange
34 . . . thrust bearing
35 . . . annular side plate
40 . . . sleeve member
41 . . . needle bearing
42 . . . primary driven gear
50 . . . clutch housing
51 . . . housing side wall
52 . . . engaging protrusion piece
61 . . . first clutch center
61$b$ . . . clutch-center side wall
61$c$ . . . clutch-center cylindrical boss
61$p$ . . . pressing partition wall
61$s$ . . . support protrusion
61$u$ . . . locking part
61$z$ . . . stopper part
62 . . . second clutch center
62$a$ . . . clutch-center outer side wall
62$b$ . . . clutch-center inner side wall
62$c$ . . . clutch-center cylindrical part
62$p$ . . . pressing partition part
62$bb$ . . . bolt attaching boss
62$h$ . . . cylindrical opening part
63$a$ . . . first push rod
63$b$ . . . second push rod
64 . . . coil spring
65 . . . washer
66 . . . washer
67 . . . lock washer
68 . . . nut
70 . . . clutching part
71 . . . friction plate (plate member)
72 . . . clutch plate (plate member)
75$a$ . . . rubber damper
75$b$ . . . rubber damper
80 . . . pressure plate
80$a$ . . . outer circumferential side wall
80$b$ . . . inner circumferential side wall
80$bh$ . . . circular hole
80$c$ . . . center boss
84 . . . disc spring
85 . . . set plate
86 . . . bolt
90 . . . insertion hole
91 . . . circumferential wall
91$u$ . . . upstream circumferential wall part
91$d$ . . . downstream circumferential wall part
93 . . . hollow
95 . . . locking pin
96 . . . coil spring

What is claimed is:

1. A multiple-disc friction clutch comprising:
   a clutch housing being axially supported by a clutch output shaft in a rotatable manner and being configured to receive drive torque from an internal combustion engine;
   clutch centers being coupled to the clutch output shaft;
   a clutching part including a plurality of plate members that are configured to transmit and shut off torque between the clutch housing and the clutch centers;
   a pressure plate being configured to press the clutching part against one of the clutch centers; and
   a biasing member biasing the pressure plate in a direction of pressing the clutching part, the clutch centers including a first clutch center and a second clutch center, the first clutch center being axially supported by the clutch output shaft in a relatively non-rotatable manner, the second clutch center being supported by the first clutch center in a relatively rotatable manner and holding the clutching part between the pressure plate and the second clutch center,
   the first clutch center and the second clutch center having a torque limiter mechanism and a torque limiter-disabling mechanism therebetween,
   the torque limiter mechanism includes elastic members that are interposed between the first clutch center and the second clutch center, the elastic members are configured to be compressed and deformed by relative rotation between the first clutch center and the second clutch center so as to transmit power between the first clutch center and the second clutch center and to reduce clutch torque by acting on the pressure plate due to relative rotation between the first clutch center and the second clutch center,
   the torque limiter-disabling mechanism includes a locking pin that is provided to the second clutch center and being configured to inhibit operation of a torque limiter of the torque limiter mechanism by preventing relative rotation between the first clutch center and the second clutch center when power is transmitted from the first clutch center to the second clutch center in an acceleration direction.

2. The multiple-disc friction clutch according to claim 1, wherein
   the locking pin is movably inserted in an insertion hole that is radially oriented, the locking pin is biased in a rotation center direction by a pin-biasing member, and
   when power is transmitted from the first clutch center to the second clutch center in a state in which the locking pin is protruded from the insertion hole toward a rotation axis center by a biasing force of the pin-biasing member, a locking part that is formed to the first clutch center locks to the locking pin that is protruded from the insertion hole, to prevent relative rotation between the first clutch center and the second clutch center.

3. The multiple-disc friction clutch according to claim 2, wherein
   the elastic members are configured to be compressed and deformed when power is transmitted from the first clutch center to the second clutch center,
   the second clutch center has a side wall that faces the pressure plate and also has an opening part that penetrates axially, at a position facing the elastic members of the side wall, and
   push rods are inserted and fitted in the opening part and are configured to be axially moved by compression deformation of the elastic members so as to push the pressure plate.

4. The multiple-disc friction clutch according to claim 1, wherein the elastic member is members are configured to be compressed and deformed when power is transmitted from the first clutch center to the second clutch center, the second clutch center has a side wall that faces the pressure plate and also has an opening part that penetrates axially, at a position facing the elastic members of the side wall, and push rods are inserted and fitted in the opening part and are configured to be axially moved by compression deformation of the elastic members so as to push the pressure plate.

5. The multiple-disc friction clutch according to claim 4, wherein the first clutch center is provided with a stopper part, the stopper part is configured to, when power is transmitted from the second clutch center to the first clutch center, stop relative rotation between the first clutch center and the second clutch center, which is performed via compression deformation of the elastic members between the second clutch center and the first clutch center, by making the second clutch center and the first clutch center come into contact with each other in response to the second clutch center and the first clutch center having a predetermined positional relationship as the relative rotation continues.

* * * * *